(12) United States Patent
Pan et al.

(10) Patent No.: US 11,938,803 B2
(45) Date of Patent: Mar. 26, 2024

(54) BATTERY CONTAINER, BATTERY PACK, AND VEHICLE

(71) Applicant: CALB CO., LTD., Jiangsu (CN)

(72) Inventors: Fangfang Pan, Changzhou (CN);
Fanming Kong, Changzhou (CN);
Ruisheng Tian, Changzhou (CN);
Xincheng Cao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 109 days.

(21) Appl. No.: 17/383,446

(22) Filed: Jul. 23, 2021

(65) Prior Publication Data

US 2022/0363117 A1    Nov. 17, 2022

(30) Foreign Application Priority Data

May 14, 2021   (CN) .......................... 202110528763.3

(51) Int. Cl.
*B60K 1/04* (2019.01)
*H01M 50/209* (2021.01)
(Continued)

(52) U.S. Cl.
CPC ............ *B60K 1/04* (2013.01); *H01M 50/209* (2021.01); *H01M 50/242* (2021.01);
(Continued)

(58) Field of Classification Search
CPC .... B60K 1/04; H01M 50/209; H01M 50/242; H01M 50/258; H01M 50/262; H01M 50/204; H01M 2220/20; Y02E 60/10
See application file for complete search history.

(56) References Cited

U.S. PATENT DOCUMENTS

| 7,758,999 B2 * | 7/2010 | Choo ................. H01M 10/613 |
| | | 429/152 |
| 10,581,125 B2 * | 3/2020 | Dudley .............. H01M 50/557 |
| 2016/0197315 A1 * | 7/2016 | Tatsumi ............. H01M 50/213 |
| | | 429/185 |

FOREIGN PATENT DOCUMENTS

| CN | 106450075 | 2/2017 |
| CN | 110994068 | 4/2020 |

(Continued)

OTHER PUBLICATIONS

"Search Report of Europe Counterpart Application", dated Feb. 1, 2022, p. 1-p. 5.

(Continued)

*Primary Examiner* — Jason D Shanske
*Assistant Examiner* — James J Triggs
(74) *Attorney, Agent, or Firm* — JCIP GLOBAL INC.

(57) ABSTRACT

A battery container, a battery pack, and a vehicle are provided. The battery container includes a battery compartment and a first beam. The battery compartment is configured to accommodate a plurality of batteries. The batteries are arranged along a first direction. The first beam extends along the first direction and forms a first side wall of the battery compartment. A first adhesive receiving groove is recessed from an inner wall of the first beam. The first adhesive receiving groove extends along the first direction. The first adhesive receiving groove is configured to be filled with a connection adhesive to connect the first beam to the batteries. The inner wall of the first beam is a side wall of the first beam facing the batteries.

19 Claims, 4 Drawing Sheets

(51) Int. Cl.
 *H01M 50/242* (2021.01)
 *H01M 50/258* (2021.01)
 *H01M 50/262* (2021.01)

(52) U.S. Cl.
 CPC ....... *H01M 50/258* (2021.01); *H01M 50/262* (2021.01); *H01M 2220/20* (2013.01)

(56) References Cited

FOREIGN PATENT DOCUMENTS

| | | |
|---|---|---|
| CN | 211404560 | 9/2020 |
| CN | 112018455 | 12/2020 |
| CN | 212113849 | 12/2020 |
| WO | 2012052131 | 6/2012 |
| WO | 2021074566 | 4/2021 |

OTHER PUBLICATIONS

"Office Action of Europe Counterpart Application", dated Oct. 4, 2023, p. 1-p. 5.
"Office Action of China Counterpart Application", dated Nov. 15, 2023, with English translation thereof, p. 1-p. 14.

\* cited by examiner

BATTERY CONTAINER, BATTERY PACK, AND VEHICLE

CROSS-REFERENCE TO RELATED APPLICATION

This application claims the priority benefit of China application no. 202110528763.3, filed on May 14, 2021. The entirety of the above-mentioned patent application is hereby incorporated by reference herein and made a part of this specification.

BACKGROUND

Technical Field

The disclosure relates to the field of battery technology. Particularly, the disclosure relates to a battery container, a battery pack, and a vehicle.

Description of Related Art

With technological development and progress, application of new energy equipment such as electric vehicles has gradually become widespread. A battery serves as an important part in the new energy equipment such as electric vehicles. Typically, in the new energy equipment such as electric vehicles, the battery is installed in a battery container to form a battery pack. During the use of the electric vehicles, vibration of the battery container may be caused under the influence of vibration of the vehicle body, which influences other structures of the battery pack. For example, a temperature regulating plate, a base plate, or a container cover may be affected.

It should be noted that the information disclosed in this background section only serves to enhance the understanding of the background of the disclosure, and therefore may include information that does not constitute the related art known to those of ordinary skill in the art.

SUMMARY

The disclosure provides a battery container and a battery pack.

According to an aspect of the disclosure, a battery container is provided. The battery container includes a battery compartment and a first beam. The battery compartment is configured to accommodate a plurality of batteries. The batteries are arranged along a first direction. The first beam extends along the first direction and forms a first side wall of the battery compartment. A first adhesive receiving groove is recessed from an inner wall of the first beam. The first adhesive receiving groove extends along the first direction. The first adhesive receiving groove is configured to be filled with a connection adhesive to connect the first beam to the batteries. The inner wall of the first beam is a side wall of the first beam facing the batteries.

According to another aspect of the disclosure, a battery pack is provided. The battery pack includes the above-mentioned battery container and a battery set. The battery set is disposed in the battery compartment on the battery container. The connection adhesive in the first adhesive receiving groove connects the battery set and the first beam.

According to another aspect of the disclosure, a vehicle is provided. The vehicle includes the above-mentioned battery pack.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
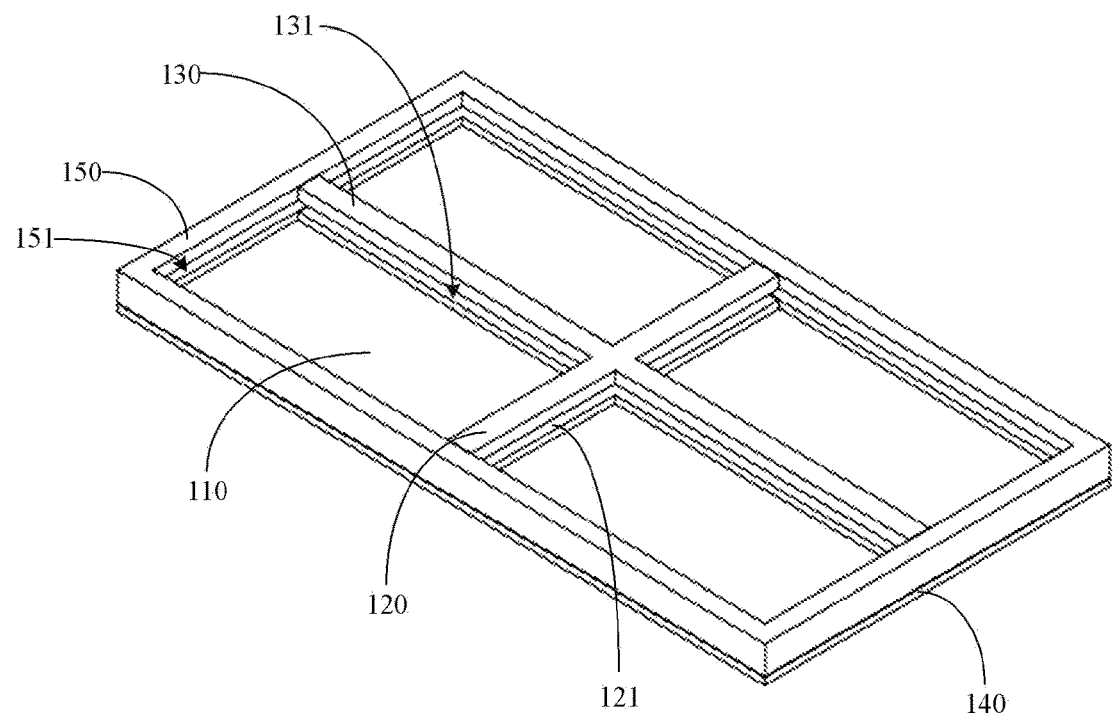
FIG. 1 is a schematic diagram of a first battery container according to an exemplary embodiment of the disclosure.

In an exemplary embodiment of the disclosure, a battery container is first provided. As shown in FIG. 1, the battery container includes a battery compartment 110 and a first beam 120. The battery compartment 110 is configured to accommodate a plurality of batteries. The batteries are arranged along a first direction. The first beam 120 extends along the first direction and forms a first side wall of the battery compartment 110. A first adhesive receiving groove 121 is recessed from an inner wall of the first beam 120. The first adhesive receiving groove 121 extends along the first direction. The first adhesive receiving groove 121 is configured to be filled with a connection adhesive to connect the first beam 120 to the batteries. The inner wall of the first beam 120 is a side wall of the first beam 120 facing the batteries.

In the battery container according to an embodiment of the disclosure, the first adhesive receiving groove 121 is disposed on the inner wall of the first beam 120 forming the battery compartment 110. The first adhesive receiving groove 121 is filled with the connection adhesive. By adhesive connecting the battery with the first beam 120, connection strength between the battery and the first beam 120 is increased, and stability of the battery connection is improved. In the embodiment of the disclosure, the beam withstands the gravity of the batteries, the force generated by the vibration of the battery, and so on. By adhesive connecting the battery with the first beam, the force of the battery on other structures of a battery pack can be reduced, and influences on other structures of the battery pack can be prevented. As an example, in the battery pack, a temperature regulating plate is present between the batteries and a base plate 140 of the battery container. By adhesive connecting the batteries with the first beam 120, the active force from the batteries on the temperature regulating plate between the battery and the base plate 140 can be reduced, and damage to the temperature regulating plate by the batteries can be prevented.

According to an embodiment of the disclosure, the battery container may also include a second beam 130. The second beam 130 forms a second side wall of the battery compartment 110. The second beam 130 is opposite to a first surface of a first battery. The first battery is a battery located on an end portion of the plurality of batteries sequentially arranged. The first surface is a surface of the first battery far away from the other batteries and perpendicular to the first direction. The second adhesive receiving groove 131 is disposed on an inner wall of the second beam 130. The second adhesive receiving groove 131 is configured to be filled with a connection adhesive to connect the second beam 130 to the first battery. The inner wall of the second beam 130 is a side wall of the second beam 130 facing the batteries.

The battery container may also include the base plate 140 and a frame 150. The frame 150 may be disposed on the base plate 140. The frame 150 and the base plate 140 form an accommodating space. The first beam 120 and the second beam 130 are disposed in the accommodating space and separate the accommodating space into a plurality of battery compartments 110. A third adhesive receiving groove 151 is disposed on an inner wall of the frame 150.

In an embodiment of the disclosure, at least one first adhesive receiving groove 121 is disposed on the inner wall of the first beam 120, and at least one second adhesive receiving groove 131 is disposed on the inner wall of the second beam 130. The specific numbers of the first adhesive receiving grooves and the second adhesive receiving grooves may be configured depending on requirements, which is not specifically limited by the disclosure.

Figure 2:
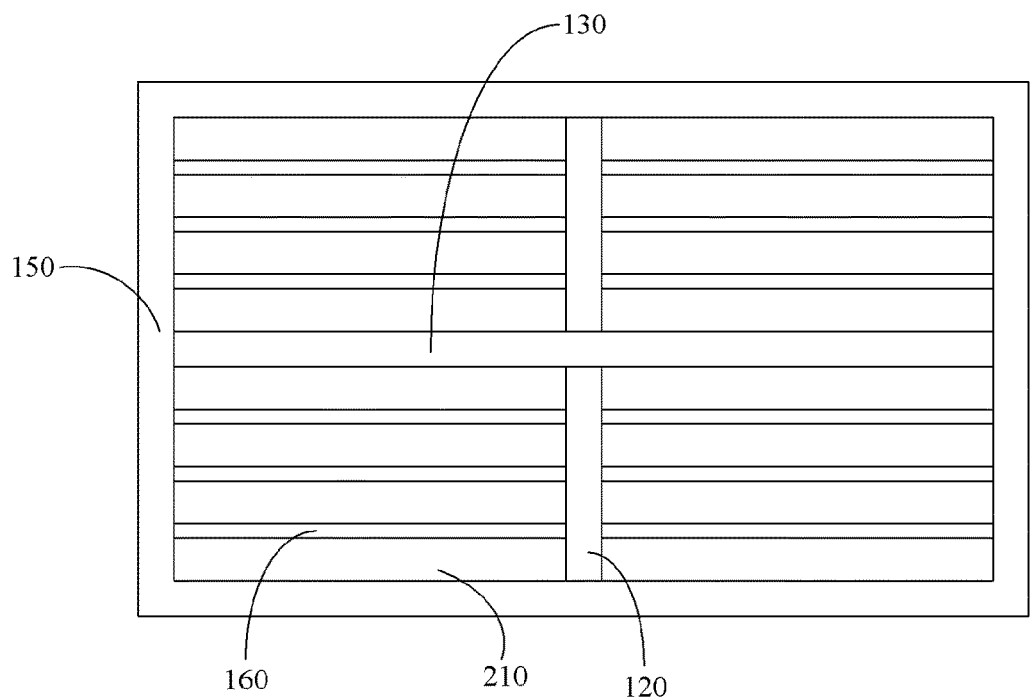
FIG. 2 is a schematic diagram of a second battery container according to an exemplary embodiment of the disclosure.

As shown in FIG. 2, the battery container may also include a spacer 160. The spacer 160 is disposed in the battery compartment 110. An adhesive receiving portion 161 is disposed on the spacer 160. The adhesive receiving portion 161 is configured to be filled with a connection adhesive to connect adjacent ones of the batteries.

As an example, the spacer 160 is located between the batteries, and/or is located between the batteries and the second beam 130. The adhesive receiving portion 161 on the spacer 160 between the batteries is filled with a connection adhesive to connect adjacent ones of the batteries. The adhesive receiving portion 161 on the spacer 160 between the batteries and the second beam 130 is filled with a connection adhesive to connect the batteries to the second beam 130. In an embodiment of the disclosure, the second beam 130 is opposite to the first surface of the first battery. The first battery is a battery located on an end portion of the plurality of batteries sequentially arranged. The spacer 160 is disposed between the first battery and the second beam 130. The adhesive receiving portion 161 on the spacer 160 is filled with a connection adhesive to connect the first battery to the second beam 130.

By disposing the spacer 160 in the battery compartment 110, the battery compartment 110 is separated into a plurality of accommodating parts. The accommodating part is configured to be placed with the batteries. The adhesive receiving portion 161 is disposed on the spacer 160. The adhesive receiving portion 161 is filled with a connection adhesive. The connection adhesive connects the batteries and the spacer 160. Accordingly, stability of the battery connection can be further improved, the active force from the batteries on the cold plate disposed between the battery and the base plate 140 can be reduced, and damage to the cold plate by the batteries can be prevented. In this embodiment, the abovementioned cold plate is taken as an example of the temperature regulating plate for description.

For each part of the battery container according to the embodiment of the disclosure, detailed description will be provided as follows.

In an embodiment of the disclosure, the base plate 140 may be a flat plate structure or a similar structure. For example, the base plate 140 may be, but not limited to, a stainless steel plate or an aluminum alloy plate. An accommodating area is disposed on the base plate 140. The accommodating area is configured to place a battery or a battery set. An orthographic projection of the batteries or the battery set on the base plate 140 is located in the accommodating area. The batteries or the battery set may be directly placed in the containing area. Alternatively, other devices, such as cooling devices, may be disposed between the batteries or the battery set and the base plate 140, which is not specifically limited by the embodiment of the disclosure.

The frame 150 is disposed on the base plate 140. The frame 150 may be connected to one side of the base plate 140 where the batteries are placed. Alternatively, the frame 150 may enclose the base plate 140. The frame 150 and the base plate 140 may be connected by one or more of welding, adhesive connection, bolting, and plug connection.

The frame 150 includes a plurality of frame beams. The frame beams are connected head to tail to form the frame 150. An accommodating space configured for the batteries to be placed is formed in the frame 150. The first beam 120 and the second beam 130 are disposed in the accommodating space. The first beam 120 and the second beam 130 separate the accommodating space into a plurality of battery compartments 110.

The base plate 140 may have a rectangular structure. The frame 150 may include four frame beams, which are connected head to tail to form the frame 150. For example, the frame 150 may include a first frame beam, a second frame beam, a third frame beam, and a fourth frame beam. The first frame beam, the second frame beam, the third frame beam, and the fourth frame beam are connected head to tail and are welded to form the frame.

As an example, the first beam 120 may be a cross beam, the second beam 130 may be a longitudinal beam. The first beam 120 and the second beam 130 are arranged to be intersected. For example, the first beam 120 and the second beam 130 are arranged perpendicularly.

The battery container may include one first beam 120 and one second beam 130. The first beam 120 is parallel to the first frame beam, and the second beam 130 is parallel to the second frame beam. The first beam 120 and the second beam 130 separate the accommodating space into four battery compartments 110. The battery set is disposed in each of the four battery compartments 110. Naturally, in actual application, it is also possible that the first beam 120 includes a plurality of first beams and the second beam 130 includes a plurality of second beams. For example, only one first beam 120 is present in the battery container. At this time, the battery container has two battery compartments 110. Alternatively, the battery container has two first beams 120 and one second beam 130. At this time, the battery container has six battery compartments 110. Nonetheless, the embodiment of the disclosure is not limited thereto.

An interior beam (e.g., the first beam 120 and the second beam 130) may be connected to the base plate 140 by welding, and the frame beam may be connected to the base plate 140 by welding. A bottom surface of the interior beam is in contact with a top surface of the base plate 140. The bottom surface of the interior beam is a flat surface, and the top surface of the base plate 140 is a flat surface. As a result, fillet welding may be performed on two sides of the interior beam to connect the interior beam to the base plate 140. A bottom surface of the frame beam is in contact with the top surface of the base plate 140. The bottom surface of the frame beam is a flat surface, and the top surface of the base plate 140 is a flat surface. As a result, fillet welding may be performed on inner and outer sides of the frame beam to connect the frame beam to the base plate 140.

In this embodiment, in order to improve the connection strength between the interior beam and the base plate 140, a connection adhesive groove may be disposed on the base plate 140 and/or the interior beam, and a connection adhesive layer may be disposed in the connection adhesive groove to connect the base plate 140 to the interior beam. The connection adhesive groove may be disposed on the inner beam, the base plate 140, or both of the base plate 140 and the inner beam. An adhesive injection passage may be disposed on the interior beam or the base plate 140. The adhesive injection passage is configured to be in communication with the outside after the interior beam is connected to the base plate 140. The adhesive injection passage is in communication with the connection adhesive groove. The connection adhesive layer is disposed in the connection adhesive groove to adhere and connect the base plate 140 to the inner beam. The frame 150 and the base plate 140 may also be connected by adhesive connection and welding.

The plurality of batteries in the battery compartment 110 are sequentially stacked to form the battery set. The batteries in the battery set are arranged along the first direction. The battery compartment 110 is enclosed by the base plate 140 and a plurality of side walls. In the side walls enclosing the battery compartment 110, at least one side wall (the first side wall) is formed by the first beam 120. The first beam 120 extends along the first direction. The first adhesive receiving groove 121 is disposed on the inner wall of the first beam 120. The first adhesive receiving groove 121 extends along the first direction. In actual application, the battery set is disposed on each of two sides of the first beam 120. Therefore, the first adhesive receiving groove 121 is disposed on each of the two side walls of the first beam 120. One or more first adhesive receiving grooves 121 may be disposed on the inner wall of the first beam 120. When multiple first adhesive receiving grooves 121 are disposed on one inner wall of the first beam 120, the first adhesive receiving grooves 121 may be disposed in parallel. The first adhesive receiving groove 121 may extend from one end of the first beam 120 to the other end of the first beam 120. Alternatively, the first adhesive receiving groove 121 may be disposed in a partial area of the first beam 120 along the first direction, which is not specifically limited by the embodiment of the disclosure.

When the battery container includes at least one second beam 130, at least one (a second side wall) of the plurality of side walls of the battery compartment 110 is formed by the second beam 130. The second beam 130 extends along a second direction. For example, the first direction is perpendicular to the second direction. The second adhesive receiving groove 131 is disposed on the inner wall of the second beam 130. The second adhesive receiving groove 131 extends along the second direction. In actual application, the battery set is disposed on each of two sides of the second beam 130. Therefore, the second adhesive receiving grooves 131 is disposed on each of the two side walls of the second beam 130. One or more second adhesive receiving grooves 131 may be disposed on the inner wall of the second beam 130. When multiple second adhesive receiving grooves 131 are disposed on the inner wall of the second beam 130, the second adhesive receiving grooves 131 may be disposed in parallel. The second adhesive receiving groove 131 may extend from one end of the second beam 130 to the other end of the second beam 130. Alternatively, the second adhesive receiving groove 131 may be disposed in a partial area of the second beam 130 along the second direction, which is not specifically limited by the embodiment of the disclosure.

Figure 3:
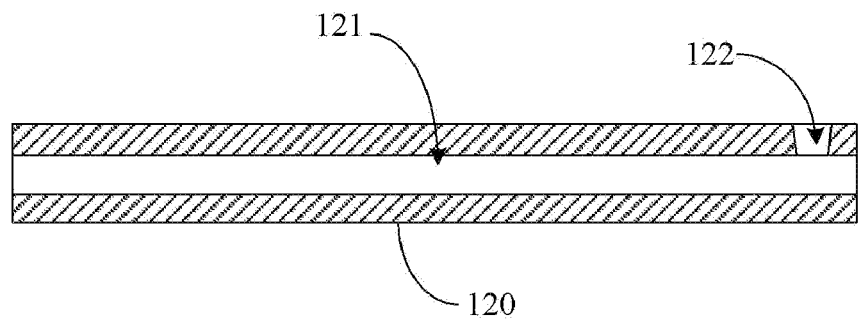
FIG. 3 is a schematic diagram of a first beam according to an exemplary embodiment of the disclosure.
Figure 4:
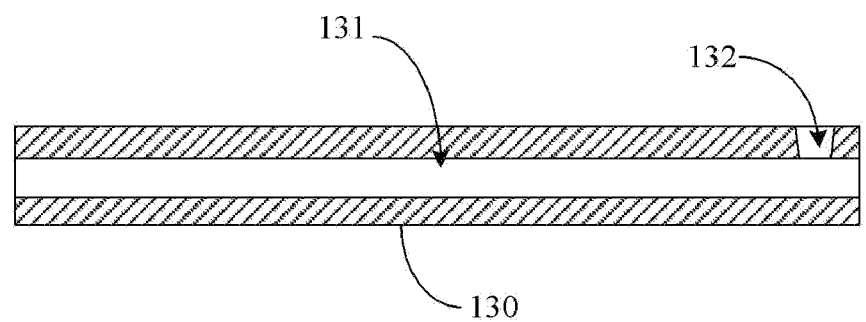
FIG. 4 is a schematic diagram of a second beam according to an exemplary embodiment of the disclosure.

As shown in FIG. 3, a first adhesive injection passage 122 is disposed on the first beam 120. The first adhesive injection passage 122 is in communication with the first adhesive receiving groove 121, and one end of the first adhesive injection passage 122 away from the first adhesive receiving groove 121 is exposed from a top surface of the first beam 120. The top surface of the first beam 120 is a surface of the first beam 120 away from the base plate 140. And/or, as shown in FIG. 4, a second adhesive injection passage 132 is disposed on the second beam 130. The second adhesive injection passage 132 is in communication with the second adhesive receiving groove 131, and one end of the second adhesive injection passage 132 away from the second adhesive receiving groove 131 is exposed from a top surface of the second beam 130. The top surface of the second beam 130 is a surface of the second beam 130 away from the base plate 140.

In an embodiment of the disclosure, the first adhesive receiving groove 121 may be in communication, or not in communication, with the second adhesive receiving groove 131. When the first adhesive receiving groove 121 is in communication with the second adhesive receiving groove 131, it is possible to dispose the first adhesive injection passage 122 on the first beam 120 or dispose the second adhesive injection passage 132 on the second beam 130. An adhesive is injected into the first adhesive receiving groove 121 and the second adhesive receiving groove 131 through the first adhesive injection passage 122 or the second adhesive injection passage 132.

When the first adhesive receiving groove 121 is not in communication with the second adhesive receiving groove 131, it is possible to dispose the first adhesive injection passage 122 on the first beam 120 and dispose the second adhesive injection passage 132 on the second beam 130. An adhesive is injected into the first adhesive receiving groove 121 through the first adhesive injection passage 122, and an adhesive is injected into the second adhesive receiving groove 131 through the second adhesive injection passage 132.

A third adhesive receiving groove 151 is disposed on the frame 150. The frame 150 may include a first frame beam, a second frame beam, a third frame beam, and a fourth frame beam. The third adhesive receiving groove 151 may be disposed on an inner side wall of the first frame beam, the second frame beam, the third frame beam, and the fourth frame beam. The third adhesive receiving groove 151 may be disposed in parallel with the base plate 140. The third adhesive receiving groove 151 may be in communication with the first adhesive receiving groove 121 and the second adhesive receiving groove 131. Alternatively, the third adhesive receiving groove 151 may be not in communication with the first adhesive receiving groove 121 and the second adhesive receiving groove 131.

Figure 5:
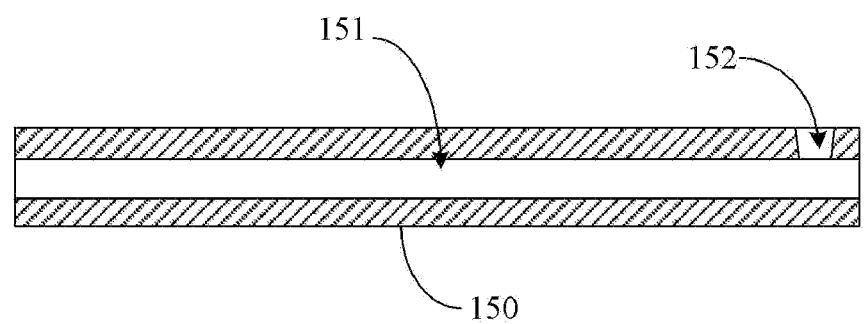
FIG. 5 is a schematic diagram of a frame according to an exemplary embodiment of the disclosure.

When the third adhesive receiving groove 151 is not in communication with the first adhesive receiving groove 121 and the second adhesive receiving groove 131, as shown in FIG. 5, a fourth adhesive injection passage 152 may be disposed on the frame 150. One end of the fourth adhesive injection passage 152 is connected to the third adhesive receiving groove 151, and the other end of the fourth adhesive injection passage 152 is disposed on a top surface of the frame 150.

One or more adhesive receiving grooves may be disposed on the inner side of the battery compartment 110. The adhesive receiving groove may be formed by the first adhesive receiving groove 121, the second adhesive receiving groove 131, and the third adhesive receiving groove 151. When multiple adhesive receiving grooves are disposed on the inner surface of the battery compartment 110, the adhesive receiving grooves may be disposed in parallel. That is, the adhesive receiving grooves are not intersected with each other. At this time, a connecting passage may be disposed between adjacent ones of the adhesive receiving grooves to connect the adhesive receiving grooves.

In an embodiment of the disclosure, the battery container may also include the spacer 160. The spacer 160 is disposed in the battery compartment 110. The adhesive receiving portion 161 is disposed on the spacer 160. The adhesive receiving portion 161 is filled with the connection adhesive to connect two sides of the spacer 160 with the batteries.

A third adhesive injection passage is disposed on the spacer 160. The third adhesive injection passage is in communication with the adhesive receiving portion 161. One end of the third adhesive injection passage away from the adhesive receiving portion 161 is exposed from a top surface of the spacer 160. The top surface of the spacer 160 is a surface of the spacer 160 away from the base plate 140.

The spacer 160 may be connected to the first beam 120 and the frame 150. At this time, the active force from the spacer 160 acts on the first beam 120 and the frame 150. That is, after the batteries are adhered to the spacer 160, at least part of the gravity of the batteries and the impact force generated by movement are transmitted through the spacer 160 to the first beam 120 and the frame 150. Accordingly, the gravity of the batteries and the impact force generated by movement acting on the temperature regulating plate may be reduced, and damage to the temperature regulating plate may be prevented.

For example, the spacer 160 and the first beam 120 and the frame 150 may be connected by one of or a combination of welding, bolting, riveting, plug connection, and adhesive connection. For example, the spacer 160 may be connected to the first beam 120 and the frame 150 by welding and adhesive connection, by plug connection and riveting, or the like, which is not specifically limited by the embodiment of the disclosure.

Figure 7:
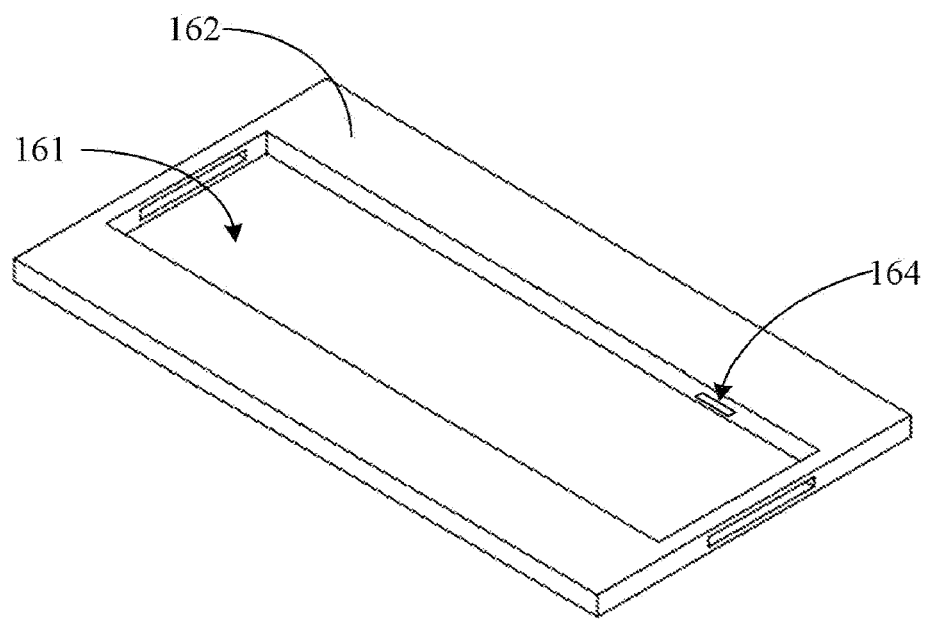
FIG. 7 is a schematic diagram of a first spacing plate according to an exemplary embodiment of the disclosure.

In a feasible embodiment of the disclosure, as shown in FIG. 7, the spacer 160 includes a first spacing plate 162. The first spacing plate 162 is disposed in the battery compartment 110. A through groove is disposed on the first spacing plate 162 to form the adhesive receiving portion 161. The through groove penetrates the first spacing plate 162 along the first direction. That is, the adhesive receiving portion 161 on the first spacing plate 162 penetrates the first spacing plate 162. A connection adhesive in the adhesive receiving portion 161 may connect the batteries on the two sides of the first spacing plate 162.

The through groove extends from one end of the first spacing plate 162 to the other end of the first spacing plate 162. That is, the through groove separates the first spacing plate 162 into an upper spacing plate and a lower spacing plate. The adhesive receiving portion 161 is disposed between the upper spacing plate and the lower spacing plate. The connection adhesive in the adhesive receiving portion 161 may connect the batteries on the two sides of the first spacing plate 162.

Figure 6:
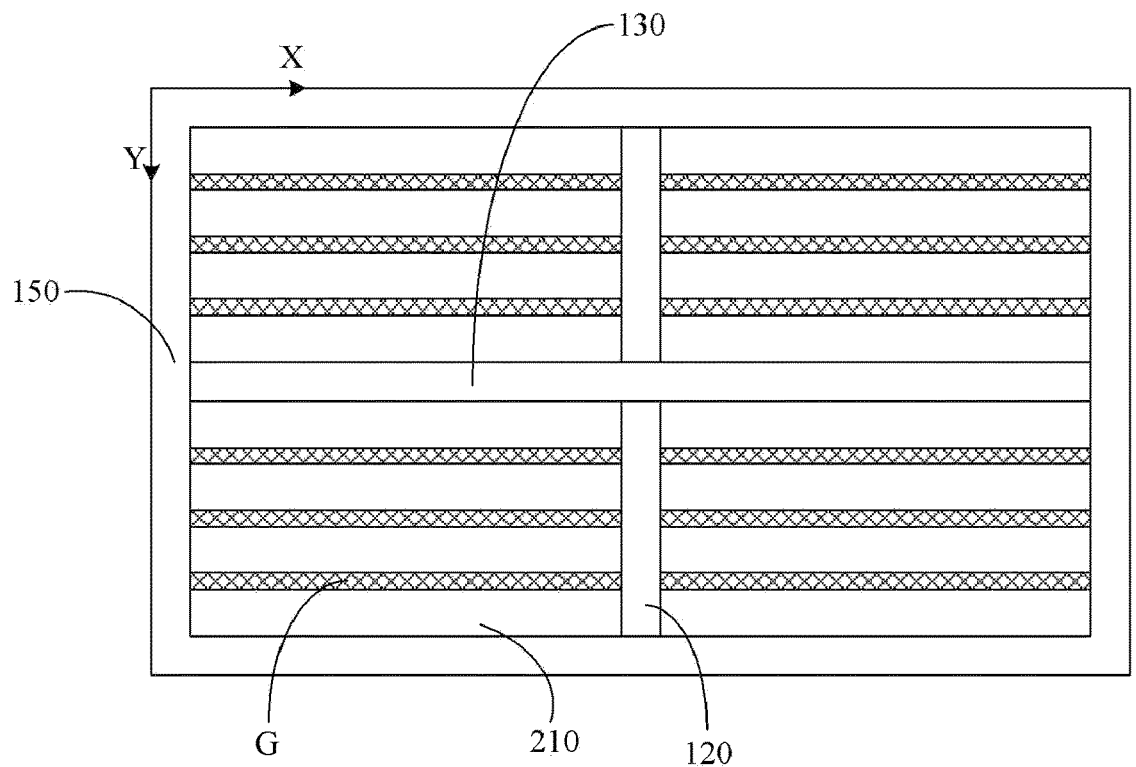
FIG. 6 is a schematic partial sectional view of a battery container according to an exemplary embodiment of the disclosure.

For example, as shown in FIG. 6, the first direction (the arrangement direction of the batteries) is a Y direction, and the length direction of the batteries is an X direction. In the X direction, a through groove G extends from one end of the first spacing plate 162 to the other end of the first spacing plate 162 to form the adhesive receiving portion. In the X direction, a first end of the through groove G corresponds to the first adhesive receiving groove 121 on the first beam 120, and the first adhesive receiving groove 121 is in communication with the through groove G, a second end of the through groove G corresponds to the third adhesive receiving groove 151 on the frame 150, and the third adhesive receiving groove 151 is in communication with the through groove G. The adhesive liquid may flow into the through groove G along the first adhesive receiving groove 121 and/or the third adhesive receiving groove 151, and may as well flow into the first adhesive receiving groove 121 and/or the third adhesive receiving groove 151 along the through groove G, for example, to facilitate adhesive injection. As another example, the battery compartment 110 includes two first beams 120 disposed opposite to each other. Two ends of the through groove G are respectively opposite to the two first adhesive receiving grooves 121 of the two first beams 120. Optionally, the first adhesive receiving groove 121 is in communication with the through groove G. The adhesive liquid may flow into the through groove G along the first adhesive receiving grooves 121, and may as well flow into the first adhesive receiving grooves 121 along the through groove G, for example, to facilitate adhesive injection.

Naturally, in actual application, the through groove may also be located inside the first spacing plate 162. At this time, a communication passage is disposed between the first adhesive receiving groove 121 on the first beam 120, the third adhesive receiving groove 151 on the frame 150, or the second adhesive receiving groove 131 on the second beam 130 and the through groove. The connection adhesive in the first adhesive receiving groove 121 on the first beam 120 or the second adhesive receiving groove 131 on the second beam 130 may flow into the through groove along the communication passage.

A third adhesive injection passage 164 is disposed on the first spacing plate 162. The third adhesive injection passage 164 is in communication with the adhesive receiving portion 161. One end of the third adhesive injection passage 164 away from the adhesive receiving portion 161 is exposed from a top surface of the first spacing plate 162. The top surface of the first spacing plate 162 is a surface of the first spacing plate 162 away from the base plate 140. Naturally, in actual application, the one end of the third adhesive injection passage 164 away from the adhesive receiving portion 161 may also be exposed from another surface of the first spacing plate 162, and the embodiment of the disclosure is not limited thereto.

The first spacing plate 162 may be connected to the frame 150 and the first beam 120. At this time, the active force from the first spacing plate 162 acts on the frame 150 and the first beam 120. That is, after the batteries are adhered to the first spacing plate 162, at least part of the gravity of the batteries and the impact force generated by movement are transmitted through the first spacing plate 162 to the frame 150 and the first beam 120. Accordingly, the gravity of the batteries and the impact force generated by movement may be prevented from entirely acting on the temperature regulating plate, and damage to the temperature regulating plate may be prevented.

For example, the first spacing plate 162 may be connected to the frame 150 and the first beam 120 by one of or a combination of welding, bolting, riveting, plug connection, and adhesive connection. For example, the first spacing plate 162 may be connected to the frame 150 and the first beam 120 by welding and adhesive connection, by plug connection and riveting, or the like, which is not specifically limited by the embodiment of the disclosure.

Figure 8:
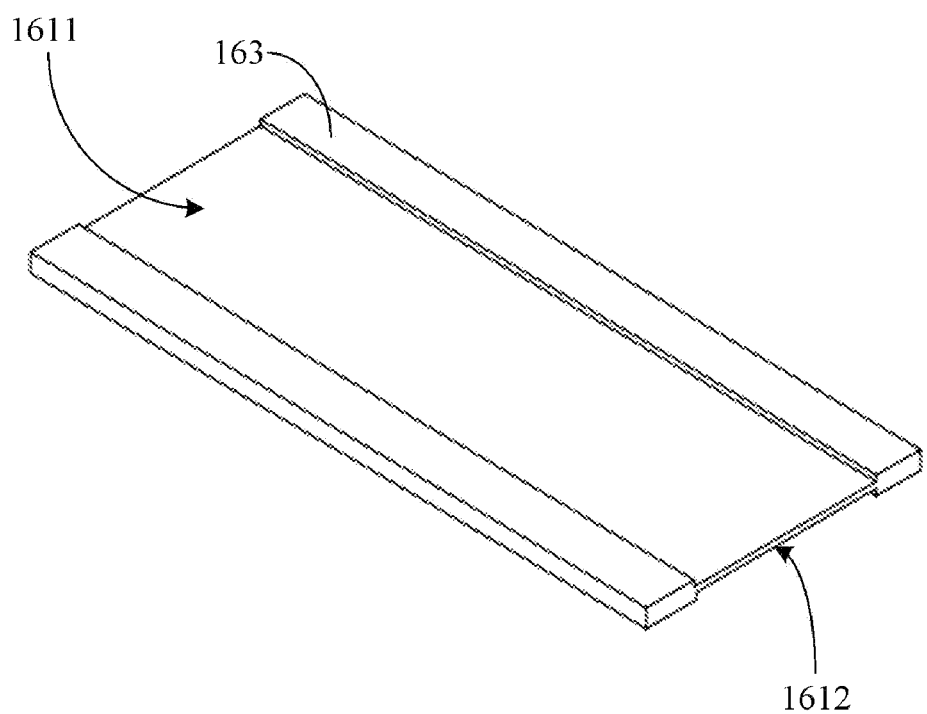
FIG. 8 is a schematic diagram of a second spacing plate according to an exemplary embodiment of the disclosure.

In another feasible embodiment of the disclosure, as shown in FIG. 8, the spacer 160 includes a second spacing plate 163. The second spacing plate 163 is disposed in the battery compartment 110. A first adhesive receiving portion 1611 is disposed on a first surface of the second spacing plate 163, and a second adhesive receiving portion 1612 is disposed on a second surface of the second spacing plate 163. The first surface of the second spacing plate and the second surface of the second spacing plate are disposed opposite to each other. In addition, the first surface of the second spacing plate and the second surface of the second spacing plate are respectively opposite to larger surfaces of the corresponding batteries.

That is, the first adhesive receiving portion 1611 and the second adhesive receiving portion 1612 are respectively disposed on two sides of the second spacing plate. A connection adhesive is disposed in the first adhesive receiving portion 1611 to be connected with the battery on one side of the second spacing plate, and a connection adhesive is disposed in the second adhesive receiving portion 1612 to be connected with the battery on the other side of the second spacing plate.

The first adhesive receiving portion 1611 may be a recess disposed on a surface of the second spacing plate opposite to the battery, and the second adhesive receiving portion 1612 may be a recess disposed on a surface of the second spacing plate opposite to the battery.

The first adhesive receiving portion 1611 may be in communication with the first adhesive receiving groove 121, the second adhesive receiving groove 131, or the third adhesive receiving groove 151. The connection adhesive in the first adhesive receiving groove 121, the second adhesive receiving groove 131, or the third adhesive receiving groove 151 may flow into the first adhesive receiving portion 1611. The second adhesive receiving portion 1612 may be in communication with the first adhesive receiving groove 121, the second adhesive receiving groove 131, or the third adhesive receiving groove 151 on the frame 150. The connection adhesive in the first adhesive receiving groove 121, the second adhesive receiving groove 131, or the third adhesive receiving groove 151 may flow into the second adhesive receiving portion 1612.

The third adhesive injection passage is disposed on the second spacing plate 163. The third adhesive injection passage is in communication with the first adhesive receiving portion 1611 and the second adhesive receiving portion 1612. One end of the third adhesive injection passage away from the adhesive receiving portion 161 is exposed from a top surface of the second spacing plate 163. The top surface of the second spacing plate 163 is a surface of the second spacing plate 163 away from the base plate 140. Naturally, in actual application, the one end of the second adhesive injection passage away from the adhesive receiving portion 161 may also be exposed from another surface of the second spacing plate 163, and the embodiment of the disclosure is not limited thereto.

The second spacing plate 163 may be connected to the frame 150 and first beam 120. At this time, the active force from the second spacing plate 163 acts on the frame 150 and the first beam 120. That is, after the batteries are adhered to the second spacing plate 163, at least part of the gravity of the batteries and the impact force generated by movement are transmitted through the second spacing plate 163 to the frame 150 and the first beam 120. Accordingly, the gravity of the batteries and the impact force generated by movement may be prevented from entirely acting on the temperature regulating plate, and damage to the temperature regulating plate may be prevented.

For example, the second spacing plate 163 may be connected to the frame 150 and the first beam 120 by one of or a combination of welding, bolting, riveting, plug connection, and adhesive connection. For example, the second spacing plate 163 may be connected to the frame 150 and the first beam 120 by welding and adhesive connection, by plug connection and riveting, or the like, which is not specifically limited by the embodiment of the disclosure.

In the battery container according to an embodiment of the disclosure, the first adhesive receiving groove 121 is disposed on the inner wall of the first beam 120 forming the battery compartment 110. The first adhesive receiving groove 121 is filled with the connection adhesive. By connecting the battery with the first beam 120 with the connection adhesive, connection strength between the battery and the first beam 120 is increased, and stability of the battery connection is improved. In addition, by adhesive connecting with batteries and the first beam 120, the active force from the batteries on the temperature regulating plate between the batteries and the base plate 140 can be reduced, and damage to the temperature regulating plate by the batteries can be prevented.

According to an exemplary embodiment of the disclosure, a battery pack is also provided. The battery pack includes the above-mentioned battery container and a battery set. The battery set is disposed in the battery compartment 110 on the battery container. A connection adhesive in the first adhesive receiving groove 121 connects the battery set and the first beam 120.

The battery container includes the battery compartment 110 and the first beam 120. The battery compartment 110 is configured to accommodate a plurality of batteries 210. The batteries 210 are arranged along a first direction. The first beam 120 extends along the first direction and forms the first side wall of the battery compartment 110. The first adhesive receiving groove 121 is disposed on the inner wall of the first beam 120. The first adhesive receiving groove 121 extends along the first direction. The first adhesive receiving groove 121 is configured to be filled with a connection adhesive to connect the first beam 120 with the batteries. The inner wall of the first beam 120 is the side wall of the first beam 120 facing the batteries.

According to an embodiment of the disclosure, the battery pack includes the battery container. The first adhesive receiving groove 121 is disposed on the inner wall of the first beam 120 forming the battery compartment 110. The first adhesive receiving groove 121 is filled with the connection adhesive. By connecting the batteries with the first beam 120 through the connection adhesive, connection strength between the batteries and the first beam 120 is increased, and stability of the battery connection is improved. In addition, by adhesive connecting the batteries with the first beam 120, the active force from the batteries on the temperature regulating plate between the batteries and the base plate 140 can be reduced, and damage to the temperature regulating plate by the batteries can be prevented.

The battery set may include a plurality of batteries 210. The batteries 210 may include a wound battery or a laminated battery. The batteries 210 each include a case and a cell. The cell is disposed in the case. In addition, a post terminal is disposed on the case. The post terminal is connected to an electrode piece on the cell.

In a feasible embodiment of the disclosure, the battery set is disposed in the battery compartment 110. The battery set includes the batteries 210. The batteries 210 are stacked. A connection adhesive layer may be disposed between adjacent ones of the batteries 210. For example, a connection adhesive is coated on the relatively large surfaces of adjacent ones of the batteries to form the connection adhesive layer. Alternatively, a recess may be disposed on the batteries 210. The recess is in communication with the first adhesive receiving groove 121. A connection adhesive is filled in the recess to connect adjacent ones of the batteries 210.

When the battery set is disposed in the battery compartment 110, the cases of the batteries in the battery set are in direct contact with the structure in the battery compartment 110. For example, the batteries located on both ends of the battery set are respectively connected to the first beam 120 and the frame 150 through the connection adhesive. Bottom surfaces of the batteries in the battery set are in contact with the cold plate on the base plate 140. Through the direct contact between the battery case and the battery container, a battery module case and other devices are prevented from being disposed in the battery container. Accordingly, the number of batteries in the container can be increased, and the energy density of the battery pack can be increased.

In another feasible embodiment of the disclosure, the battery container may also include the spacer 160. The spacer 160 is disposed in the battery compartment 110. The adhesive receiving portion 161 is disposed on the spacer 160. The adhesive receiving portion 161 is filled with the connection adhesive to connect the two sides of the spacer 160 with the batteries.

The number of spacers 160 in the battery container may be determined depending on the number of batteries. When N batteries are in the battery set, the battery container may include N−1 spacers 160. The N−1 spacers 160 are sequentially arranged in accordance with the arrangement direction of the batteries. The N−1 spacers 160 and the bilateral container beams form N accommodating parts. One battery is disposed in each accommodating part. The adhesive receiving portion 161 is disposed on the spacer 160. The connection adhesive in the adhesive receiving portion 161 is connected with the battery adjacent thereto.

The connection adhesive in the adhesive receiving groove may flow into the adhesive receiving portion 161 and form a connection adhesive layer in the adhesive receiving portion 161 to connect the batteries with the spacer 160. The connection adhesive layer may be formed in the adhesive receiving portion 161. Alternatively, the connection adhesive may flow over the adhesive receiving portion 161 and form the connection adhesive layer in a gap between the spacer 160 and the batteries.

For example, the spacer 160 may include the first spacing plate 162 or the second spacing plate 163. When the spacer 160 includes the first spacing plate 162, N batteries are in the battery set, and the battery container may include N−1 first spacing plates 162. The N−1 first spacing plates 162 are sequentially arranged in accordance with the arrangement direction of the batteries. The N−1 first spacing plates 162 and the bilateral container beams form N accommodating parts. One battery is disposed in each accommodating part. The adhesive receiving portion 161 is disposed on the first spacing plate 162. The connection adhesive in the adhesive receiving portion 161 is connected with the battery adjacent thereto.

When the spacer 160 includes the second spacing plate 163, N batteries are in the battery set, and the battery container may include N−1 second spacing plates 163. The N−1 second spacing plates 163 are sequentially arranged in accordance with the arrangement direction of the batteries. The N−1 second spacing plates 163 and the bilateral container beams form N accommodating parts. One battery is disposed in each accommodating part. The adhesive receiving portion 161 is disposed on the second spacing plate 163. The connection adhesive in the adhesive receiving portion 161 is connected with the battery adjacent thereto.

Note that, in the embodiment of the disclosure, the structure of the battery container has been described in detail in the implementation of the battery container, and the description thereof will not be repeated herein in the embodiment of the disclosure.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery container, comprising:
   a battery compartment, configured to accommodate a plurality of batteries, wherein the batteries are arranged along a first direction;
   a first beam, extending along the first direction and forming a first side wall of the battery compartment, wherein a first adhesive receiving groove is recessed from an inner wall of the first beam, the first adhesive receiving groove extends along the first direction, the first adhesive receiving groove is configured to be filled with a connection adhesive to connect the first beam to the batteries, and the inner wall of the first beam is a side wall of the first beam facing the batteries; and
   a second beam, forming a second side wall of the battery compartment, wherein the second beam is opposite to a first surface of a first battery, the first battery is a battery located on an end portion of the batteries sequentially arranged, the first surface is a surface of the first battery perpendicular to the first direction, a second adhesive receiving groove is disposed on an inner wall of the second beam, the second adhesive receiving groove is configured to be filled with a connection adhesive to connect the second beam to the first battery, and the inner wall of the second beam is a side wall of the second beam facing the batteries,
   wherein the first beam and the second beam are arranged perpendicularly.

2. The battery container according to claim 1, further comprising:
   a base plate; and
   a frame, wherein the frame and the base plate form an accommodating space, the first beam and the second beam are disposed in the accommodating space and separate the accommodating space into a plurality of battery compartments, and a third adhesive receiving groove is disposed on an inner wall of the frame.

3. The battery container according to claim 1, wherein a first adhesive injection passage is disposed on the first beam, the first adhesive injection passage is in communication with the first adhesive receiving groove, one end of the first adhesive injection passage away from the first adhesive receiving groove is exposed from a top surface of the first beam, and the top surface of the first beam is a surface of the first beam away from a base plate; and/or
   a second adhesive injection passage is disposed on the second beam, the second adhesive injection passage is in communication with the second adhesive receiving groove, one end of the second adhesive injection passage away from the second adhesive receiving groove is exposed from a top surface of the second beam, and the top surface of the second beam is a surface of the second beam away from the base plate.

4. The battery container according to claim 2, wherein a first adhesive injection passage is disposed on the first beam, the first adhesive injection passage is in communication with the first adhesive receiving groove, one end of the first adhesive injection passage away from the first adhesive receiving groove is exposed from a top surface of the first beam, and the top surface of the first beam is a surface of the first beam away from the base plate; and/or
   a second adhesive injection passage is disposed on the second beam, the second adhesive injection passage is in communication with the second adhesive receiving groove, one end of the second adhesive injection passage away from the second adhesive receiving groove is exposed from a top surface of the second beam, and the top surface of the second beam is a surface of the second beam away from the base plate.

5. The battery container according to claim 1, further comprising:
   a spacer, wherein the spacer is disposed in the battery compartment, an adhesive receiving portion is disposed on the spacer, and the adhesive receiving portion is configured to be filled with a connection adhesive to connect adjacent ones of the batteries.

6. The battery container according to claim 5, wherein the spacer comprises:
   a first spacing plate, wherein the first spacing plate is disposed in the battery compartment, a through groove is disposed on the first spacing plate to form the adhesive receiving portion, and the through groove penetrates the first spacing plate along the first direction.

7. The battery container according to claim 6, further comprising:
   a base plate; and
   a frame, wherein the frame and the base plate form an accommodating space, the first beam and the second beam are disposed in the accommodating space and separate the accommodating space into a plurality of battery compartments, and a third adhesive receiving groove is disposed an inner wall of the frame; and
   wherein the through groove extends from one end of the first spacing plate to another end of the first spacing plate, and two ends of the through groove are respectively opposite to the first adhesive receiving groove and the third adhesive receiving groove on the frame, and/or the battery compartment comprises two first beams disposed opposite to each other, and the two ends of the through groove are respectively opposite to the first adhesive receiving groove of the two first beams.

8. The battery container according to claim 5, wherein the spacer comprises:
   a second spacing plate, wherein the second spacing plate is disposed in the battery compartment, a first adhesive receiving portion is disposed on a first surface of the second spacing plate, a second adhesive receiving portion is disposed on a second surface of the second spacing plate, the first surface of the second spacing plate and the second surface of the second spacing plate are disposed opposite to each other, and the first surface of the second spacing plate and the second surface of the second spacing plate are each opposite to a corresponding one of the batteries.

9. The battery container according to claim 5, wherein the adhesive receiving portion is in communication with the first adhesive receiving groove.

10. The battery container according to claim 6, wherein the adhesive receiving portion is in communication with the first adhesive receiving groove.

11. The battery container according to claim 7, wherein the adhesive receiving portion is in communication with the first adhesive receiving groove.

12. The battery container according to claim 8, wherein the adhesive receiving portion is in communication with the first adhesive receiving groove.

13. The battery container according to claim 5, wherein the spacer is connected to the first beam.

14. The battery container according to claim 8, wherein the spacer is connected to the first beam.

15. The battery container according to claim 1, wherein the first adhesive receiving groove disposed on the inner wall of the first beam comprises at least one first adhesive receiving groove, and the second adhesive receiving groove disposed on the inner wall of the second beam comprises at least one second adhesive receiving groove.

16. A battery pack, comprising:
the battery container according to claim 1; and
a battery set, disposed in the battery compartment on the battery container, wherein the connection adhesive in the first adhesive receiving groove connects the battery set and the first beam.

17. The battery pack according to claim 16, wherein the battery set comprises the plurality of batteries sequentially arranged, a recess is disposed on each of the batteries, the recess is in communication with the first adhesive receiving groove, and the recess is filled with a connection adhesive to connect adjacent ones of the batteries.

18. The battery pack according to claim 16, wherein the battery set comprises the plurality of batteries sequentially arranged, and a connection adhesive layer is disposed between adjacent two of the batteries.

19. A vehicle, comprising the battery pack according to claim 16.

* * * * *